Sept. 5, 1967 W. L. PROBERT 3,340,525
SIGNAL TRANSMITTING APPARATUS FOR SEQUENTIALLY
TRANSMITTING SIMULTANEOUSLY GENERATED SIGNALS
Filed Jan. 29, 1962 2 Sheets-Sheet 1
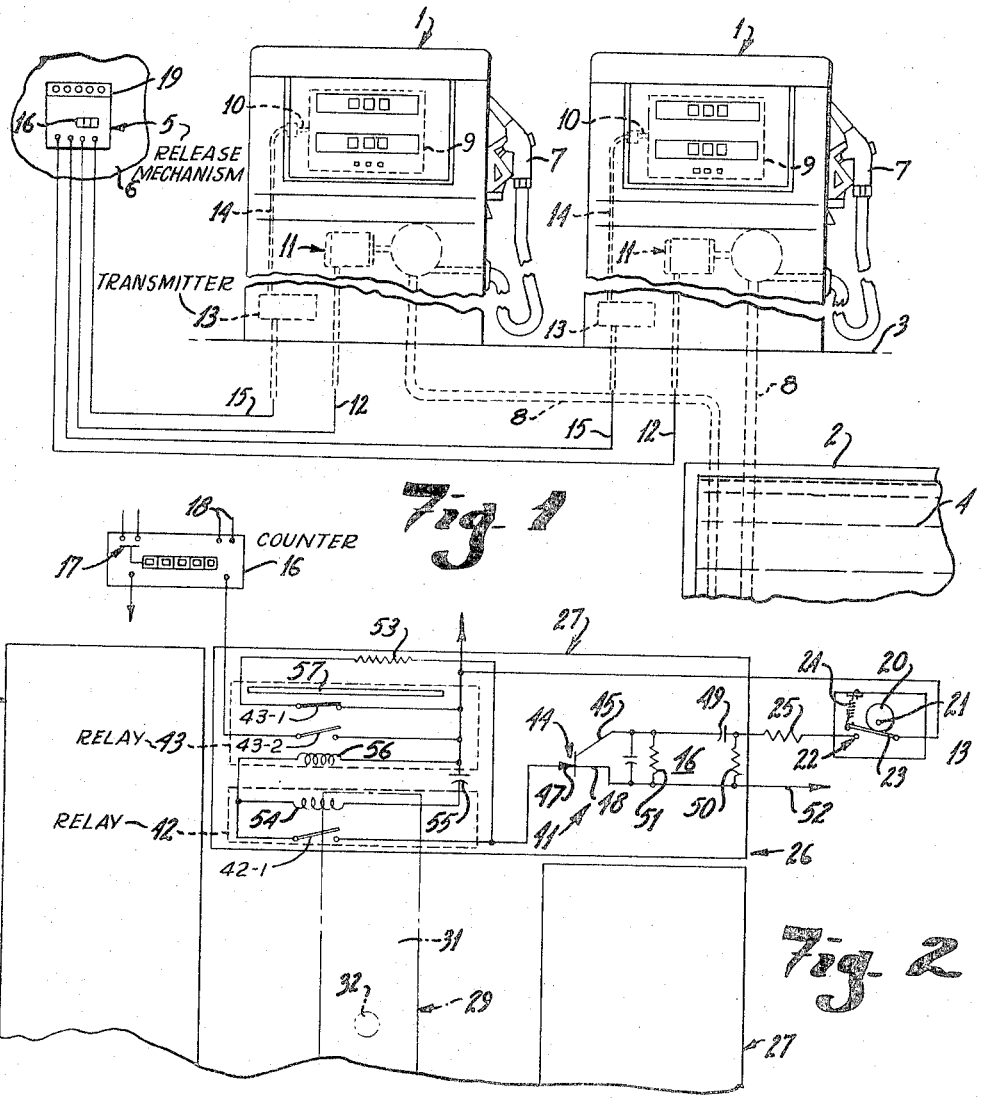
INVENTOR.
WALTER L. PROBERT
BY
Andrus & Starke
Attorneys INVENTOR.
WALTER L. PROBERT
BY
Andrus & Starke
Attorneys United States Patent Office 3,340,525
Patented Sept. 5, 1967

3,340,525
SIGNAL TRANSMITTING APPARATUS FOR SEQUENTIALLY TRANSMITTING SIMULTANEOUSLY GENERATED SIGNALS
Walter L. Probert, Erie, Pa., assignor to A. O. Smith Corporation, Milwaukee, Wis., a corporation of New York
Filed Jan. 29, 1962, Ser. No. 169,416
14 Claims. (Cl. 340—346)

This invention relates to a pulse transmission apparatus and particularly to totalizing the number of pulses from a plurality of sources without the loss of any pulses due to the simultaneous generation of pulses at two or more of the plurality of sources.

Many applications require simultaneous and parallel running of units or machinery in which it is advisable to obtain a total summary of the individual operations. A particularly significant practical application involves remote inventory control of gasoline and the like at a conventional service station. A highly satisfactory device is more fully shown and disclosed in the copending application of James H. McGaughey, entitled, Control System, which was filed Feb. 9, 1961, with Ser. No. 88,208, and which is assigned to a common assignee herewith. As more fully disclosed therein, each of the dispensing pumps or units of a service station includes a pulse generating means for transmitting a series of pulses, correlated to the flow of gasoline dispensed from the pump, to a central control unit. A master control including a presettable counting mechanism connected to the pulse generating means is provided in the control unit for shutting off all of the dispensing units and preventing further delivery of gasoline after a prereleased quantity of gasoline has been withdrawn from a central storage tank. Coded input means are provided for actuating the presettable counting mechanism and presetting thereof for releasing selected quantities from the main central storage tank to the several dispensing units.

The bulk supplier of gasoline can, therefore, fill the main storage tank in accordance with his convenience and through a coded control means, allow a selective release of limited quantities of the gasoline to a service station owner or attendant.

The central control unit must be able to accept simultaneous pulses from two or more of the dispensing units and actuate the preset counting mechanism for each pulse in order to provide a true and reliable actuation thereof in accordance with the total flow of gasoline from the main storage unit. Generally, storage and separating means are provided for accepting simultaneously generated pulses from the various dispensing units and sequentially transmitting them to a suitable output. Although relatively fast electronic counters can be provided or constructed, they are relatively expensive and include the inherent unreliability of complicated electronic circuitry. Mechanical interlocks or pulse separating units are complicated and cumbersome.

The problem is particularly severe for gasoline inventory control systems and the like in which there is always a serious danger of explosion. The pulse generating means within the pump must be such that it cannot, under any practically encountered circumstances, result in igniting of the gasoline fumes with a resulting explosion.

The present invention is particularly directed to an explosion-proof pulse generating means and a low cost, reliable means for accepting and counting the generated pulses. The present invention employs relatively stable and highly reliable components having a very long life.

Generally, in accordance with the present invention, the generated pulses from each of the several dispensing units are transmitted to corresponding storage means which are connected to a common output through a circuit altering means. A magnetic means is intermittently coupled with the several circuit altering means and controls the device to complete the circuit from the storage means to the common output. Each actuation of the circuit altering means in essence tests whether or not a pulse has been received by the associated storage means. If the pulse has been received, it is transmitted to the control means which actuates the counter or other totalizing means. If a pulse has not been received, the actuation of the circuit altering means does not affect the output counter in any manner.

The storage means, in accordance with one feature of the present invention, is a solid state amplifying device such as a silicon controlled rectifier or the like. The silicon controlled rectifier accepts a very low power input pulse and establishes a relatively large power current for driving the counter circuit. The rectifier thus simultaneously provides amplification and memory of an input pulse.

In accordance with another highly distinctive and important feature of the present invention, the circuit altering means is a small magnetically responsive switch which is actuated by the movable magnet means. A booster coil is connected in circuit with the switch and establishes a magnetic field upon initial closing of the switch to positively close the switch for a predetermined period. This feature of the invention is particularly important for obtaining a reliable count of all pulses.

The pulse generating means within the dispensing unit itself or the like may include a magnetic circuit having a movable armature for slowly opening and rapidly closing of the magnetic circuit. The armature means is coupled to be driven by the computer or flow generating means of the dispensing unit such that the armature rapidly completes the magnetic circuit once for each unit flow through the dispenser. A pickup coil is associated with the magnetic circuit and responds to the rapid time rate of flux change when the magnetic circuit is rapidly completed to establish a small output control signal or pulse. This pulse generating means directly establishes a suitable pulse for actuating a silicon controlled rectifier or the like and does not involve any open switching of an electric current. The dangers associated with arcing of switches and the like are therefore avoided. Although the power level of the pulse is extremely low, it is completely satisfactory for triggering the silicon controlled rectifiers and the like which are preferably employed in the present invention.

The present invention thus provides a highly reliable and explosion-proof counting system particularly adapted for gasoline inventory controls and the like. The invention in its broadest aspect of course has many other applications wherein a highly accurate count of electrical pulses and the like is desired or necessary.

The drawings furnished herewith illustrate the best mode presently contemplated for carrying out the invention.

In the drawings:

FIG. 1 is a diagrammatic illustration of a multiple pump service station;

FIG. 2 is a schematic circuit diagram of a portion of a counting mechanism actuated in accordance with the flow through the several dispensing units shown in FIG. 1;

FIG. 6 is a diagrammatic view of an alternative pulse generating means.

Figure 3:
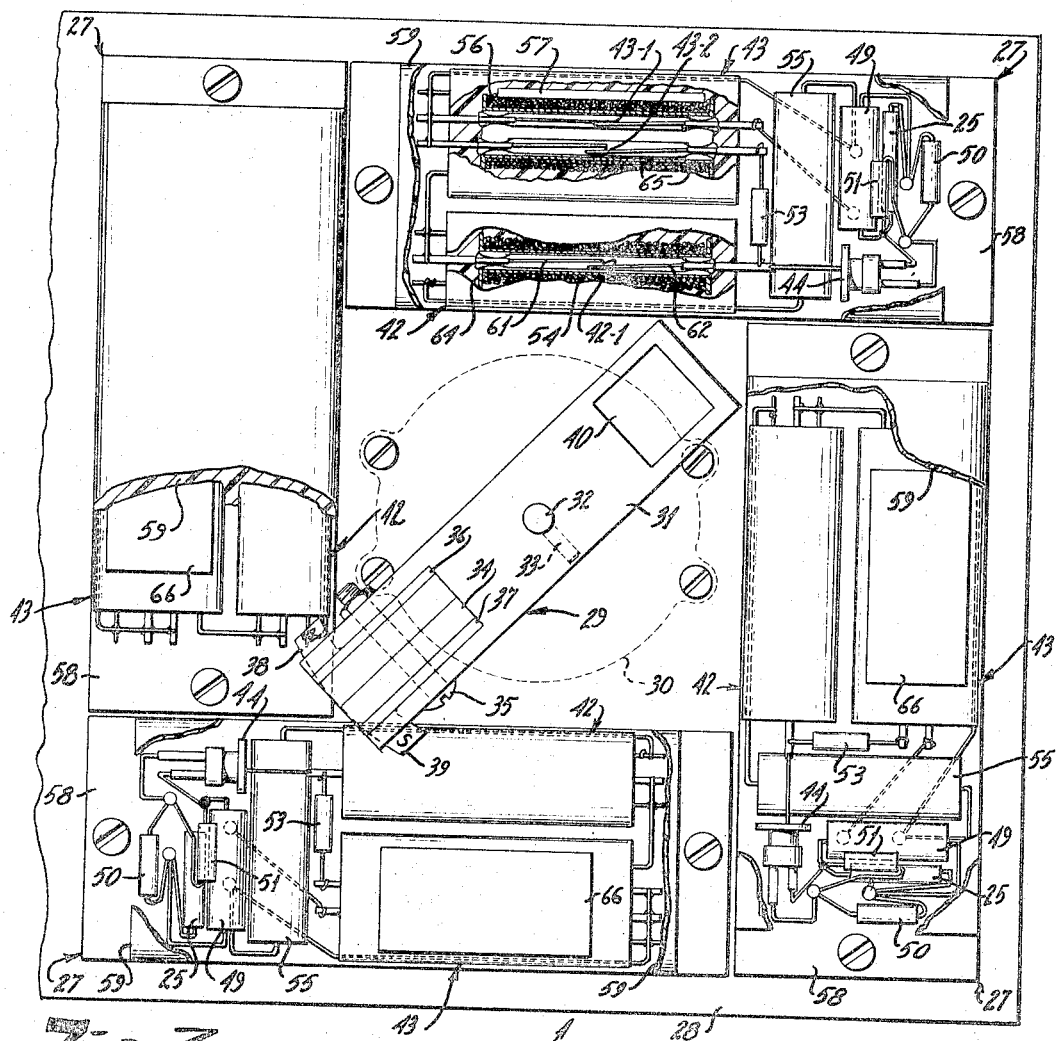
FIG. 3 is a plan view of a pulse storage and transmitting means more schematically shown in FIG. 2 and with parts broken away to show inner details of construction.

Referring to the drawings and particularly to FIG. 1, a service station is diagrammatically shown as including a pair of gasoline pumps or dispensing units 1 individually connected to a central storage tank 2 which is buried in the ground 3 in spaced relation to the pumps 1. Gasoline 4 is stored within the tank 2 for selective discharge and delivery through the pumps 1 to the customers. A code operated release mechanism 5 is shown mounted in a fragmentary portion of the wall 6 of a service building, not otherwise shown. The release mechanism 5 is coupled to the pumps 1 and includes presettable means for recording the total discharge of gasoline through the several pumps 1 and for controlling the operation of pumps 1. In this manner, selected quantities of gasoline can be released for discharge through the pumps 1 and a relatively close control on the gasoline 4 maintained.

Each of the pumps 1 may be of any conventional construction. Each pump 1 is shown including a dispensing nozzle 7 connected to an individual suction line 8 from the central storage tank 2. A computer 9 is provided for recording the gallonage and cost of the gasoline which is dispensed at each operation of the corresponding pump 1. The computer 9 establishes a mechanical movement in accordance with the quantity flow through the suction line 8 to the nozzle 7 which is translated into a visual gallonage reading and also into a cost figure in accordance with known construction. A stub shaft 10 projects outwardly from the computer 9 within each pump 1 and is suitably coupled within the computer 9 to rotate in accordance with the flow of gasoline.

A motor-pump unit 11 is connected in the suction line 8 and also to suitable power lines 12 for selective dispensing of gasoline from the corresponding pump 1. The dispensing nozzle 7 normally includes a motor-pump unit switch, not shown, for selective energizing of the motor-pump unit 11.

A small signal transmitter 13 is coupled to the stub shaft 10 by a flexible shaft or cable 14. As more fully described hereinafter, the transmitter 13 establishes a pulse signal for each preselected unit of flow and is connected by suitable transmitting lines 15 for actuating the release mechanism 5. As shown, the transmitting line 15 is buried in the ground between the release control 5 and the pumps 1 to eliminate unauthorized tampering therewith.

The release mechanism 5 is connected in circuit to the motor-pump unit 11 and controls the connection of the power lines 12 to an incoming power source. Release mechanism 5 is constructed to allow release and withdrawal of selected amounts of gasoline from the central storage tank 2. The released gasoline is then dispensed from the pumps 1 until the total released quantity has been dispensed after which the release mechanism 5 must be again preset for further dispensing of gasoline.

Referring particularly to FIG. 2, a preferred electrical circuit is schematically shown illustrating the operation of the release mechanism 5 as applied to multiple self-contained pumps shown in FIG. 1.

Generally, the release mechanism 5 includes a counter 16 having a main control switch 17 associated and operated thereby. The switch 17 is connected to control the completion of the circuit from incoming power lines 18 to the motor-pump power supply lines 12. In the illustrated embodiment of the invention, it is assumed that the switch 17 is opened and disconnects lines 12 from lines 18 when the counter 16 is at a zero reading and is closed at all other readings.

A push button input unit 19, shown in FIG. 1, is interconnected to preset the counter 16 from a zero reading position in any desired increments; for example, 500 or 1,000 gallons. In the previously identified copending application of James H. McGaughey, a push button input unit is provided for actuating a presetting cyclic motor which, in response to a correct input, presets the counter 16 from the zero position. As more fully disclosed therein, a code card, not shown, is provided within the release mechanism 5 for successively establishing a new code input in response to each release actuation of the mechanism 5. The input control for presetting of the counter 16 does not form any part of the present invention and consequently no further description thereof is deemed necessary or given.

Referring particularly to FIG. 2, the illustrated transmitter 13 includes a cam 20 rotatably mounted on a shaft 21 which is coupled to be driven by the flexible cable 14. A switch 22 includes a switch arm 23 held in engagement with the periphery of cam 20 in any suitable manner diagrammatically shown as a separate spring 24. The cam 20 is shaped to hold the switch arm 23 to open the switch 22 except for a short period in each revolution of the cam.

Switch 22 is connected to a pulse circuit and establishes a short pulse each time the switch closes. The switch 22 is connected to a source of power as presently described in series with a current limiting resistor 25. The current through switch 22 is maintained sufficiently low to prevent arcing between the switch contacts and establishes an inherently safe electrical circuit.

Figure 5:
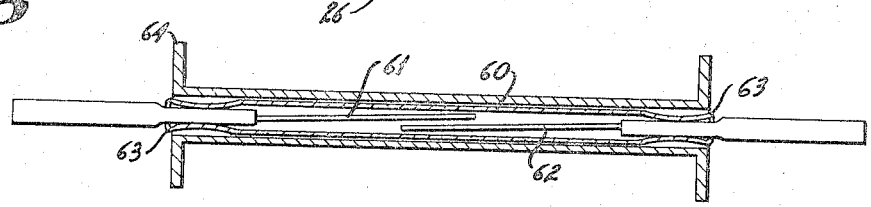
FIG. 5 is an enlarged sectional view of a switch structure shown in FIG. 3 to more clearly illustrate a preferred construction of the illustrated embodiment of the present invention.
Figure 4:
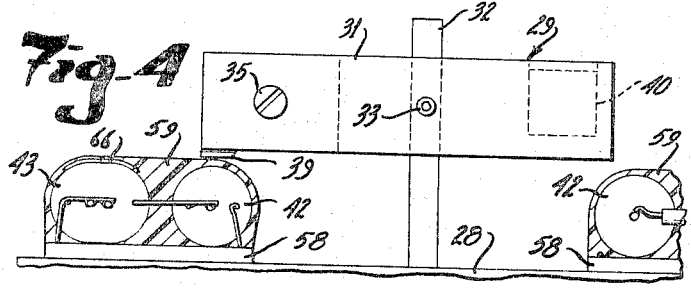
FIG. 4 is an elevational view of the scanner or actuator shown in FIGS. 2 and 3.

In operation, the cam 20 is rotated in synchronism with the rate of flow of gasoline from the corresponding pump 1 to establish a corresponding train of pulses which is fed to a pulse discriminator 26 which is schematically shown in FIG. 2 and a preferred construction of which is more clearly shown in FIGS. 3–5.

Generally, the pulse discriminator 26 includes four input-output pulse modules 27, one for each of the dispensing units or pumps 1. The modules 27 are generally rectangularly shaped encapsulated units and are mounted upon a suitable base or chassis 28 to define a rectangular outline. A module actuating scanner 29 is rotatably mounted within the rectangular configuration of the modules 27 and is continuously driven by a small motor 30 at a constant speed to sequentially align the outer end of the scanner 29 with the individual modules 27.

Motor 30 may be of the usual synchronous variety which has a constant speed slightly faster than the maximum speed of the flexible cable 14 such that each module 27 is aligned with the one end of scanner 29 in spaced time periods less than the period between successive pulses from the transmitter 13.

Referring particularly to FIGS. 3 and 4, the module actuating scanner 29 includes a scanner arm 31 formed of plastic or other suitable non-magnetic material. A rotatable supporting shaft 32 is centrally secured to the scanner arm 31 as by a set screw 33 and is coupled to be driven by the small motor 30. A permanent ceramic magnet 34 or the like is secured to a bifurcated outer end of the scanner arm 31 and securely held in place by a nut and bolt unit 35 of brass or other suitable non-magnetic material. A north pole plate 36 and a south pole plate 37 are clamped between the opposite sides of the permanent magnet 34 and the adjacent portions of the bifurcated end of the scanner arm 31. Each of the pole plates 36 and 37 includes a laterally projecting pole 38 and 39 extending circumferentially outwardly immediately beneath the scanner arm 31. In the illustrated embodiment of the invention, the scanner arm 31 rotates in a clockwise direction with the north pole 38 leading and the south pole 39 trailing.

A suitable counterweight 40 of lead or the like is secured within the suitable recess in the opposite end of the scanner arm 31 to prevent loading or bending of the shaft 32.

Referring particularly to FIG. 2, one of the pulse modules 27 is schematically shown. Generally, the module 27 includes a pulse storage and amplifying circuit 41 connected to the incoming transmitting line 15 from the corresponding pump 1. A trigger relay 42 is mounted immediately beneath the path of the poles 38 and 39 of the scanner arm 31, and a control relay 43 is mounted immediately outwardly of the relay 42.

The storage and amplifying circuit 41 includes a silicon controlled rectifier 44 having a trigger element or gate 45 connected in circuit with the transmitting line 15 from switch 22 of transmitter 13 by a pulse forming and shaping network 46. The silicon controlled rectifier 44 also includes an anode 47 and a cathode 48 connected in an output circuit.

The pulse forming and shaping network 46 includes a capacitor 49 connected in series with switch 22 and gate 45 of rectifier 44. Paralleled resistors 50 and 51 are connected one to each side of capacitor 49 and to a suitable negative potential bias line 52.

When switch 22 closes, current flows into the capacitor 49 as well as through the current limiting resistor 25 and resistor 50. The current from capacitor 49 flows through the resistor 51 and the gate 45 and decreases exponentially as the charge on the capacitor 49 increases. This creates the pulse which switches the rectifier 44 to the conducting state and establishes current flow in the output circuit of anode 47 and cathode 48.

When switch 22 opens, the capacitor 49 discharges through resistors 50 and 51 and creates another pulse but of reverse polarity and therefore of no effect on the rectifier 44.

The capacitor 49 is therefore in discharged condition at each closing of switch 22.

A set of normally closed contacts 43–1 of the control relay 43 and a load resistor 53 are connected in series with anode 47 and cathode 48 to a suitable power source, not shown.

The operation of the silicon control rectifier 44 is generally similar to that of the usual thyratron tube with a minute pulse applied to the gate 45 switching the rectifier 44 to conduct a substantial current through the anode-cathode junction and the load resistor 53. The resistor 53 provides a circuit for maintaining the current and holding the rectifier 44 in a switched or current conducting state until the potential at the cathode 48 drops below a minimum potential.

Rectifier 44 can be switched with a very low power, as low as three milliwatts, and can then control a relatively large current in the collector circuit. As a result, a very low input power pulse from the transmitter 13 provides a relatively large output current. The silicon control rectifier consequently not only serves as a memory device, but simultaneously serves as a current amplification device having an output which can directly actuate the control relay 43, as more fully described hereinafter.

The trigger relay 42 includes a set of normally open contacts 42–1 connected in a series with the cathode 48, a booster coil 54 in relay 42, and a capacitor 55 to the positive side of the power source, not shown, and thus in parallel with the load resistor 53 and control relay contacts 43–1.

The normally open contacts 42–1 are mounted immediately below the path of the rotating magnet 34. The magnetic field of magnet 34 when aligned with contacts 42–1 is such as to close contacts 42–1. When contacts 42–1 close, a portion of the cathode current passes through the booster coil 54 and capacitor 55. The current in the booster coil 54 establishes a magnetic field which maintains the contacts 42–1 closed, even though the magnet 34 has moved past the contacts and its field is insufficient to hold the contacts closed.

The capacitor 55 is progressively charged by the current therethrough and the current in the circuit decreases as the capacitor charge increases. After a selected period of time, the magnet 34 has rotated past the contacts 42–1 and the current has decreased to the drop-out level of relay 42 and the contacts 42–1 open.

The booster coil 54 and the capacitor 55 conjointly hold the contacts 42–1 closed for a selected minimum period in response to the initial closing of the contacts by the magnet 34. As more fully described hereinafter, the action of the booster coil 54 has been found to be exceedingly important in providing essentially perfect counting of the incoming pulses from the various pumps 1.

The control relay 43 includes a relay coil 56 which is connected in series circuit with the normally open contacts 42–1 and in parallel with the booster coil 54 and capacitor 55. When the contacts 42–1 close, the coil 56 is also energized to actuate the relay 43 and open contacts 43–1.

A biasing permanent magnet 57 forms a part of the control relay 43 and establishes a magnetic field holding the set of contacts 43–1 in the normally closed position. When the relay coil 56 is energized, the magnetic field established is sufficient to overcome the magnetic effect of the magnet 57 and the contact 43–1 open.

The opening of contacts 43–1 breaks the firing or loading circuit through load resistor 53 and contacts 43–1 for the silicon control rectifier 44.

The control relay 43 also includes a set of normally open contacts 43–2 which are connected in circuit with the counter 16. When the relay coil 56 is energized, the contacts 43–2 close and momentarily energize the counter 16 to record the dispensing of a unit of gasoline.

In summary, each module 27 generally functions in the following manner. A pulse generated by operation of a pump 1 is transmitted from the corresponding transmitter 13 to the module 27 and triggers the silicon control rectifier 44 to conduct via resistor 53 and contacts 43–1. Subsequently, when the magnet 34 of scanner arm 31 passes over the module 27 and closes the normally open contacts 42–1, the circuits through the booster coil 54 of the relay 42 and through the relay coil 56 of the control relay 43 are completed and actuate the relays 42 and 43.

Energization of relay coil 56 opens the normally closed contacts 43–1 and breaks the firing circuit of rectifier 44. Simultaneously, the normally open contacts 43–2 close and actuate counter 16.

Although the firing circuit for the rectifier 44 through the resistor 53 is broken by the opening of the normally closed contacts 43–1, the firing circuit is maintained through the magnetically closed contacts 42–1 with the current passing through the booster coil 54 and the capacitor 55. The current through the coil 54 latches the contacts 42–1 closed to maintain the firing circuit independently of the control relay contacts 43–1.

The capacitor 55 in this firing circuit charges up with a resultant decrease in the current. When the current in the coil 54 reaches the drop-out value, the contacts 42–1 open and the capacitor 55 discharges through the booster coil 54 and the control relay coil 56. The latter discharge current provides an additional time delay on the opening of the control relay 43 and insures proper actuation of the control relay 43 and transmission of a pulse to the counter 16.

Contacts 43–1 are open at the instant contacts 42–1 open. This breaks the anode circuit of the rectifier 44 which returns to the blocking or nonconducting state. Shortly thereafter, the current in relay coil 56 drops below the holding value and the contacts 43–1 close. The circuit is then in the standby position again.

It is pointed out that the control relay 43 holds the contact 43–1 open until its current decreases to the drop-out value. This will insure a sufficient open circuit period for resetting of the silicon control rectifier 44 to the blocking or nonconducting condition.

Referring particularly to FIGS. 3–5, a construction of the module unit 27 including reed-type relays and reed switches or contacts, such as referred to above, is illustrated. The corresponding elements, schematically shown in FIG. 2 and physically shown in FIGS. 3–5, are correspondingly numbered for purposes of simplicity and clarity of explanation and description.

Generally, the relays 42 and 43 are small potted units cemented or otherwise secured on a suitable insulating base plate 58 which in turn is secured to the supporting chassis 28. Capacitors 49 and 55, resistors 50, 51 and 53 and the silicon control rectifiers 44 are also mounted on the base plate 58 with the relays 42 and 43. The complete assembly is incapsulated in a suitable potting material 59 to completely seal the unit from the surrounding atmosphere and provide a long life module, as shown in FIGS. 3 and 4.

Although each of the relays 42 and 43 may be of any suitable construction such as mercury switches and the like, applicant has found that reed relays of the construction hereinafter described are particularly adapted for and give reliable operation in the circuit schematically shown in FIG. 2.

Referring particularly to FIGS. 3 and 5, the single contact relay 42 is shown in section. Generally, the relay 42 includes a tubular enclosure or shell 60 of glass or similar insulating material with leaf spring reeds 61 and 62 secured within the opposite ends of the shell 60 by a fused end portion 63 thereof. The reeds 61 and 62 project inwardly within the shell 60 and terminate in slightly overlapping relation to form the contacts 42–1 which are shown schematically in FIG. 2. The reeds 61 and 62 are mounted with a slight spacing of the overlapping ends and form the normally open position of the switch 42–1.

A tubular coil form 64 is concentrically disposed over the tubular shell 60 with the booster coil 54 wound thereon encircling the contacts formed by the reeds 61 and 62. Energizing of the coil 54 establishes a magnetic field which bends the reeds 61 and 62 and moves the inner ends into engagement to effect a closing of the normally open contacts 42–1. Similarly, the movement of the magnet 34 over the reeds 61 and 62 causes a flexing or a bending of the reeds and the engagement of the inner ends thereof.

Referring particularly to FIG. 3, the north pole 38 of the magnet 34 first approaches the relay 42. It is important for proper operation that the coil 54 be wound to establish polarization with the north pole at the leading or entrance portion of the relay, such that with the magnet 34 disposed over the relay, the north pole is generally aligned with the south pole of the relay and the south pole of the magnet is generally aligned with the north pole of the relay coil 54.

The control relay 43 is similarly constructed with a pair of shell enclosed reed contact units for the contacts 43–1 and 43–2. A single coil form 65 is concentrically mounted about the reed switches and the relay coil 56 is wound therein for proper actuation of the contacts 43–1 and 43–2. The bar-like biasing permanent magnet 57 is mounted within the coil form 65 adjacent the reed contact unit forming contacts 43–1 and the effect of its magnetic field is restricted to operation of contacts 43–1.

A magnetic shield 66 is secured overlying the top of the control relay 43 as shown in FIGS. 3 and 4. The magnetic shield 66 bypasses any stray magnetic effect from the rotating magnet 34 and maintains the operation of the control relay 43 under the conjoint control of the biasing magnet 57 and the coil 56.

The operation of the illustrated embodiment of the invention is generally summarized as follows.

The storage tank 2 is filled with gasoline 4 at any desired intervals sufficient to maintain a supply for release to the service station operator. If the service station operator desires gasoline, he receives the proper code input for actuation of the code operated release mechanism 5 and by proper actuation of the push button input unit 19 actuates the counter 16 and closes contacts or switch 17.

Thereafter, any one or more of the pumps or dispensing units 1 can be actuated to withdraw gasoline, to the extent released by the actuation of counter 16, from the storage tank 2 and deliver it through the nozzle 7 to customers.

As the gasoline is dispensed through the nozzle 7, the computer 9 is actuated through the conventional pump and meter connection to record the gallonage and cost. Simultaneously, the transmitter 13 is actuated through the connection to the stub shaft 10 to provide an electrical pulse for each unit of delivery; for example, a pulse for each gallon.

The input pulse triggers the silicon control rectifier 44 which fires and establishes a "holding" current through the anode 47, cathode 48 and resistor 53. The rectifier 44 then conducts and is in the on state until such time as the anode current falls below a preselected level.

The scanner arm 31 is rotated at an angular velocity slightly greater than the maximum pulse repetition rate from any one of the several pumps 1. Consequently, when a pulse is received and the rectifier 44 switched on, the scanner arm 31 moves the permanent magnet 34 over the corresponding module 27 before a subsequent pulse can be again applied to the module 27. The switching action in the module 27 is extremely rapid and the rotational speed of arm 31 need be only slightly greater than the maximum pulse repetition rate.

When the magnet 34 moves over the module 27, the normally open contacts 42–1 are momentarily closed. With the rectifier 44 switched on and the contact 42–1 closed, the booster coil 54 is energized to insure holding of the contacts 42–1 in the closed position and the charging of capacitor 55.

Simultaneously, the control relay 43 is energized to close the counter-operating contacts 43–2 and record the flow of the one gallon through the corresponding nozzle 7. The energization of control relay 43 also opens contacts 43–1 and breaks the holding circuit for the rectifier 44 which is then held in the conducting state only by the circuit through the relay 42.

As the charge on capacitor 55 builds up, current in the circuit decreases to the drop-out value of the relay 42 which returns to standby. Capacitor 55 discharges through the control relay coil 56 to maintain the relay energized for an additional time period and insures proper actuation of the counter 16.

In this manner, the modules 27 are successively tested or momentarily turned on to transmit a pulse if a flow-generated pulse from the related pump 1 has fired the corresponding silicon control rectifier 44.

The described modules have been operated with both standard relays and with reed-type relays as disclosed in the preferred embodiment. With the standard relays, the circuit has been operated over 100,000 times and with the reed-type relays, over 1,000,000 times with a random input and with perfect correlation to the mechanical input counts to the device. Thus, the control can be employed in commercial practice without any substantial danger of loss due to miscounting.

In FIG. 6, an alternative structure for transmitter 13 is diagrammatically illustrated in which the pulse forming and shaping network 46 may be eliminated and the signal connected directly to the gate 45 of rectifier 44. The power of the generated signal may be sufficiently low to provide an inherently explosion proof circuit as previously noted, the current may be limited by the current limiting resistor 25.

A U-shaped magnetic frame 67 formed of a permanent magnet carries a signal generating coil 68 wound on a portion thereof. An armature 69 spans the open end of the frame 67 and is pivotally mounted to one side thereof as by the pivotal connection 70. A spring 71 continuously biases the armature 69 to bridge the ends of the frame 67 and complete the magnetic circuit. A cam 72 is connected to be driven by the flexible shaft 14 and includes a spiral cam edge with a sharp radial edge joining the starting and terminal ends of the spiral cam edge.

In operation, the cam 72 rotates and slowly pivots the armature 69 away from the one end of the frame 67. The current in coil 68 is dependent on the rate of change of magnetic flux. The slow movement of the armature 69 does not result in a sufficiently rapid change to generate any appreciable current in the coil. As the cam 72 rotates to align the end of the armature 69 with the radial edge, the support for armature 69 is rapidly removed and the biasing spring 71 rapidly moves the armature 69 toward the magnetic frame 67. This results in a very rapid increase in the flux through the magnetic frame 67 and a relatively rapid rate of flux change. As a result, a small signal pulse is generated within the coil 68 and fed by the transmitting line 15 to the release mechanism 5 which then operates as heretofore described.

The structure of this invention may also employ an extremely low power trigger pulse such as generated by the illustrated transmitter. This is a particularly important feature of the invention when applied in a dispensing of explosive mediums such as gasoline.

The present invention, as described, provides a relatively simple and inexpensive pulse transmitting and totalizing apparatus which has an exceptionally high degree of accuracy and reliability. The complete enclosure of the relays substantially increases the life of the total unit by protecting the contacts from dirt and corrosion.

Various modes of carrying out the invention are contemplated as being within the scope of the following claims particularly pointing out and distinctly claiming the subject matter which is regarded as the invention.

I claim:

1. A signal transmitting apparatus for transmitting a signal, comprising,
    (a) a signal storage means,
    (b) a normally open switch means connected to said storage means and in a transmission circuit,
    (c) means to periodically close the switch means and complete the transmission circuit for transmission of a signal from the storage means,
    (d) a booster coil coupled to actuate said switch means and connected to said signal storage means by said switch means for energization by a signal from the storage means, and
    (e) means connected in circuit with said switch means and operative to open the switch means a predetermined period after the closing thereof.

2. The construction of claim 1 wherein said last-named means includes,
    (a) a capacitive means connected in series circuit with said booster coil and operative to progressively reduce the current through the coil to open said switch means a predetermined period after the closing thereof.

3. The signal transmitting apparatus of claim 1 wherein said transmission circuit includes,
    (a) a relay coil connected in circuit with said normally open switch means for energization when said switch means is closed,
    (b) normally open relay contacts coupled to the relay coil in a signal transmitting circuit, and
    (c) normally closed contacts coupled to the relay coil and connected in circuit with said signal storage means for conditioning the storage means to store a signal and resetting the storage means.

4. A pulse signal transmitting and amplifying module connected to a pulse source, comprising,
    (a) an amplifying unit having an input terminal for connection to the pulse source and initially controlling conduction and having a low level input signal requirement and a large power output circuit, said amplifying unit being fired to conduct by receipt of an input signal at the input terminal and the output circuit controlling the conduction through the amplifying unit subsequent to receipt of a proper input signal,
    (b) a reed switch having overlapping conducting reeds connected in the output circuit of the amplifying unit,
    (c) a booster coil wound about said reed switch and adapted to actuate said reeds when energized,
    (d) a timing means operatively connected with said reed switch,
    (e) relay contacts,
    (f) an impedance connected in a firing circuit with said relay contacts and said amplifying unit,
    (g) a means biasing the relay contacts closed,
    (h) second relay contacts for establishing an output signal when closed,
    (i) an output control coil electromagnetically coupled to said relay contacts and connected in series with said reed switch, said control coil opening the first-named relay contacts and closing the second-named relay contacts when energized.

5. A pulse signal transmitting and amplifying module connected to a pulse source, comprising,
    (a) a silicon rectifier having a gate element connected to the pulse source and a cathode element connected to a negative potential and an anode element,
    (b) a totally enclosed tubular reed switch having overlapping conducting reeds normally disengaged, one of said reeds being connected to said anode,
    (c) a booster coil wound about said reed switch and adapted to engage said reeds when energized,
    (d) a capacitor connected in series with the booster coil and said reed switch to a positive potential and charged upon closing of said reed switch,
    (e) a second reed switch,
    (f) a resistor connected in a series firing circuit between a positive potential with said second reed switch and said silicon control rectifier,
    (g) a permanent magnet mounted adjacent the second reed switch and biasing the second reed switch closed,
    (h) a third reed switch for establishing an output signal when closed,
    (i) an output control coil wound about said second and third reed switches and connected in series with said first reed switch, said control coil opening the second reed switch and closing the third reed switch when energized, and
    (j) means to periodically actuate said first reed switch.

6. A pulse signal transmitting and amplifying device connected to a periodic pulse source, comprising,
    (a) a solid state amplifier having a trigger element connected to the pulse source and an output element,
    (b) contact means connected in an output circuit with said output element,
    (c) means to periodically actuate the contact means,
    (d) a booster coil electromagnetically coupled to actuate said contact means and connected in a booster coil energization circuit with said contact means,
    (e) timing means energized in synchronism with the booster coil and coupled to return the contact means to the normal position after a predetermined period,
    (f) a firing circuit connected in an output circuit with said output element independently of the first-named output circuit, and
    (g) means responsive to actuation of the contact means to operatively open said firing circuit.

7. A pulse transmitting apparatus for transmitting a series of time spaced pulses from a plurality of dispensing means for delivering a fluid from a fluid storage means, comprising,
    (a) a magnetically responsive switch,
    (b) a magnetic means periodically coupled to actuate the switch,
    (c) a pulse amplifying storage means,
    (d) a booster coil associated with said switch for actuating the switch and connected in series circuit with said switch and said pulse storage means,
    (e) a separate sensing means for each of said dispensing units and each comprising,
        (1) a generally U-shaped permanent magnet, (2) an armature mounted to bridge the permanent magnet and having means for coupling to the corresponding dispensing unit to slowly open the magnetic circuit and rapidly close the magnetic circuit, once for each predetermined volume of fluid passing through the dispensing unit, (3) a coil wound on the permanent magnet to generate a pulse for each delivery of the predetermined volume of fluid, and (f) means responsive to an electrical signal from the storage means connected in a series circuit with said switch and said storage means for transmitting a pulse from the storage means.

8. A flow totalizing apparatus for recording the total flow of a fluid through a plurality of separately operable dispensing units, comprising in combination;

(a) a separate sensing means in each of said dispensing units and each comprising;

(1) a generally U-shaped permanent magnet, (2) an armature mounted to bridge the permanent magnet and coupled to the dispensing unit to slowly open the magnetic circuit and rapidly close the magnetic circuit, once for each unit delivery of fluid, (3) a coil wound on the permanent magnet to generate a pulse for each unit delivery of fluid;

(b) a plurality of storage and transmitting modules, one for each of said dispensing units and each comprising;

(1) a silicon rectifier having a gate element connected to the coil and a cathode element connected to a negative potential and an anode element, (2) a totally enclosed tubular reed switch having overlapping conducting reeds normally disengaged, one of said reeds being connected to said anode, (3) a booster coil wound about said reed switch and adapted to engage said reeds when energized, (4) a capacitor connected in series with the booster coil and said reed switch to a positive potential and charged upon closing of said reed switch, (5) a second reed switch, (6) a resistor connected in a series firing circuit between a positive potential with said second reed switch and said silicon control rectifier, (7) a permanent magnet mounted adjacent the second reed switch and biasing the second reed switch closed, (8) a third reed switch for establishing an output signal when closed, (9) an output control coil wound about said second and third reed switches and connected in series with said first reed switch, said control coil opening the second reed switch and closing the third reed switch when energized; and (c) a scanning device for sequentially actuating said first reed switches and comprising;

(1) a scanner arm rotatably mounted within the modules and having an actuating end passing sequentially over said first reed switches, (2) a permanent magnet secured within the actuating end and having pole pieces extending laterally of the arm immediately below the lower plane of the scanner arm, said magnet being polarized to align opposite poles of the magnet and booster coil with the magnet aligned with the booster coil, and (3) a drive means coupled to rotate the scanner arm at a constant speed at least as rapidly as the maximum frequency of pulse generation by any one dispensing unit.

9. In a pulse storage and transmission circuit, (a) means to generate a series of electrical pulses, (b) a silicon control rectifier having a gate element connected to said means and having a first and a second output circuit, said rectifier being fired in response to an incoming pulse from said means and establishing a signal in the first output circuit, (c) circuit altering means in said first output circuit and adapted to effectively open the circuit, (d) said second output circuit constituting a transmission circuit and having intermittently operated means normally disenabling the transmission circuit and periodically enabling the transmission circuit, and (e) means responsive to an electrical signal from said rectifier in said transmission circuit and coupled to actuate the circuit altering means in response to enabling of the transmission circuit.

10. The construction of claim 9 wherein said transmission circuit includes, (a) a normally open switch for said intermittently operated means, (b) a capacitor connected in series with said switch, and (c) an output coil connected in parallel with said switch.

11. The construction of claim 10 having, (a) a booster coil electromagnetically controlling said normally open switch and being connected in series with the capacitor and in parallel with the output coil.

12. A signal transmitting apparatus for transmitting a pulse signal, comprising, (a) magnetically responsive contacts, (b) a rotating magnetic actuator having a leading magnetic pole and a trailing magnetic pole of opposite polarity and mounted to periodically move past said contacts, (c) a booster coil disposed adjacent the contacts and wound to establish magnetic poles of opposite polarity aligned with the magnetic actuator poles, said coil being connected in series with said contacts in a series energizing circuit for latching said contacts into an actuated position in response to actuation of the contacts by said magnetic actuator, and (d) means to subsequently open said series energizing circuit.

13. A signal transmitting apparatus for transmitting a pulse signal, comprising, (a) a rotating magnetic actuator, (b) magnetically responsive contacts mounted to be intermittently aligned with and actuated by the magnetic actuator, (c) a booster coil connected in series with said contacts in a series energizing circuit for latching said contacts into an actuated position in response to actuation of the contacts by said magnetic actuator, and (d) timing means responsive to energization of the booster coil and connected to open the circuit of the booster coil a predetermined period after energization thereof.

14. In combination with a dispensing unit for delivering an explosive fluid, (a) a switch mounted within the dispensing unit and coupled to the dispensing unit and being periodically actuated in response to flow therethrough, (b) a gate controlled switch means having a triggering element and having an output circuit constituting a pulse storage means, (c) a power source connection, (d) a pulse forming circuit interconnecting the switch in series with the triggering element and the power source connection to fire said switch means and store a pulse in the output circuit in response to actuation of the switch, (e) a transfer switch means connected in a second output circuit of the gate controlled switch means,
(f) means to periodically actuate the transfer switch means and complete the second output circuit, and
(g) means responsive to completion of the second output circuit to open the first named output circuit.

References Cited

UNITED STATES PATENTS

| | | |
|---|---|---|
| 2,192,216 | 3/1940 | Woodruff. |
| 2,658,142 | 11/1953 | St. John _____ 340—183 X |
| 2,671,211 | 3/1954 | Black et al. _____ 340—345 |
| 2,908,778 | 10/1959 | Strandberg _____ 200—87.3 X |
| 3,013,137 | 12/1961 | Broeck _____ 340—183 |

NEIL C. READ, *Primary Examiner.*

THOMAS B. HABECKER, *Examiner.*

A. WARING, *Assistant Examiner.*